United States Patent [19]
Satomura

[11] Patent Number: 5,327,300
[45] Date of Patent: Jul. 5, 1994

[54] DIGITAL INFORMATION REPRODUCING APPARATUS INCLUDING A CIRCUIT FOR DETECTING FREQUENCY DEVIATION OF A SYNCHRONISM CLOCK

[75] Inventor: Seiichirou Satomura, Kawasaki, Japan

[73] Assignee: Canon Kabushiki Kaisha, Tokyo, Japan

[21] Appl. No.: 908,548

[22] Filed: Jun. 30, 1992

Related U.S. Application Data

[63] Continuation of Ser. No. 413,483, Sep. 27, 1989, abandoned.

[30] Foreign Application Priority Data

Sep. 29, 1988 [JP] Japan .................. 63-245486

[51] Int. Cl.⁵ .................. G11B 5/09; G11B 15/12
[52] U.S. Cl. .................. 360/51; 360/61; 369/47
[58] Field of Search .......... 360/32, 51, 61, 49; 375/108; 331/49; 307/525, 527; 369/44.25, 44.32, 47, 48, 59

[56] References Cited

U.S. PATENT DOCUMENTS 4,864,433 9/1989 Wakumura .................. 360/51
4,912,573 3/1990 Murabayashi et al. .................. 360/51

*Primary Examiner*—Donald Hajec
*Assistant Examiner*—Won Tae C. Kim
*Attorney, Agent, or Firm*—Fitzpatrick, Cella, Harper & Scinto

[57] ABSTRACT

A digital information reproducing apparatus includes a reading device to read out digital information recorded on a recording medium; a first clock generator to produce a first clock synchronized with the digital information read out by the reading device; a second clock generator to generate a second clock of a predetermined frequency; a processing circuit to process the digital information read out by the reading device on the basis of the first clock produced by the first clock generator; and a switching circuit for switching from the first clock produced by the first clock generator to the second clock generated by the second clock generator and for outputting the second clock to the processor in a case when the frequency of the first clock produced by the first clock generator deviates from a predetermined range. The first clock generator includes a PLL circuit for inputting the digital information read out by the reading device and producing the first clock. The switching circuit includes a frequency comparison judging circuit which determines that the frequency of the first clock has deviated from the predetermined range when a predetermined number of first clocks are not counted by a first counter until a predetermined number of second clocks are counted by a second counter.

11 Claims, 5 Drawing Sheets

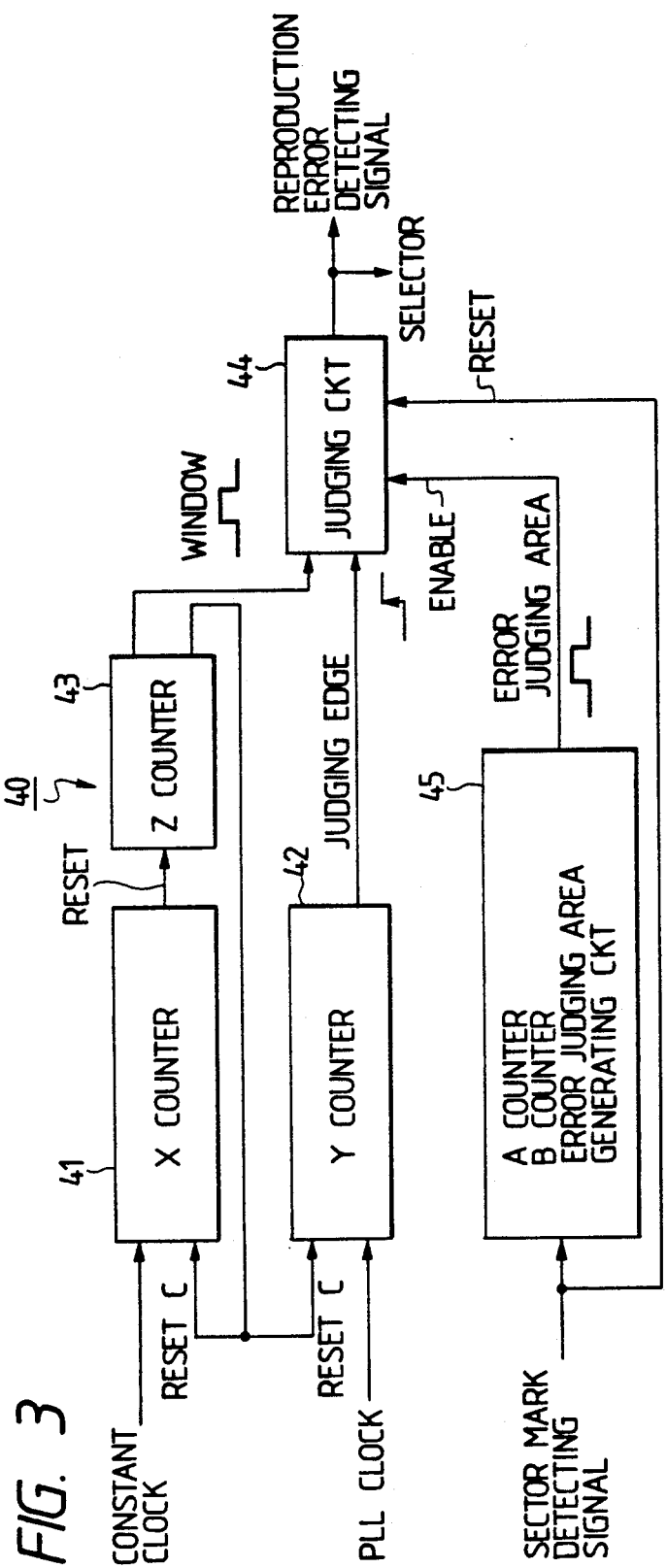
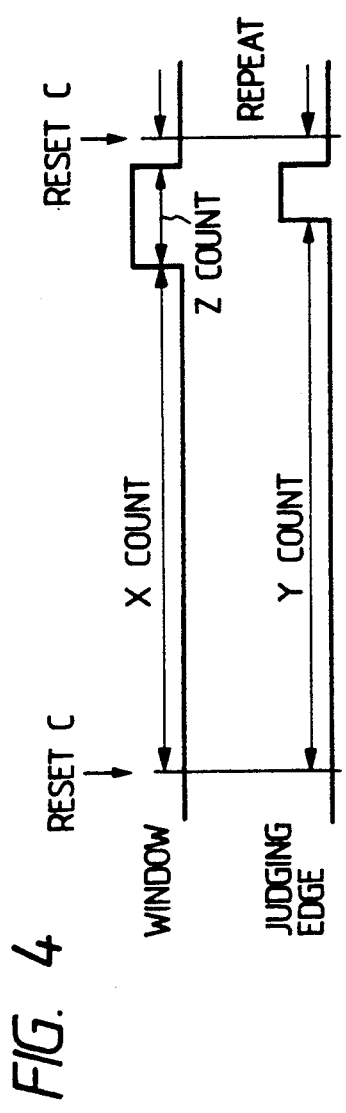
FIG. 3
FIG. 4

5,327,300

DIGITAL INFORMATION REPRODUCING APPARATUS INCLUDING A CIRCUIT FOR DETECTING FREQUENCY DEVIATION OF A SYNCHRONISM CLOCK

This application is a continuation of prior application Ser. No. 07/413,483 filed Sep. 27, 1989, now abandoned.

BACKGROUND OF THE INVENTION

1. Field of the Invention

The present invention relates to an apparatus for reproducing information from a medium such as a disk, tape, or the like on which information was optically or magnetically recorded and, more particularly, to a digital information reproducing apparatus having a PLL circuit to produce a reference clock.

2. Related Background Art

FIG. 6 shows an example of a conventional signal reproducing circuit of a magnetic disk drive apparatus or an optical disk drive apparatus.

That is, a raw reproduction signal reproduced by a signal detector 11 comprising an optical head or a magnetic head is amplified by a preamplifier 12 and is binarized by a binarizing circuit 13 comprising a differentiating circuit, a peak detecting circuit, a comparator, and the like. A PLL (Phase Locked Loop) circuit 14 outputs a reference clock synchronized with the encoded data on the basis of the binarized signal (encoded data). The encoded data is input to a decoder 15 synchronously with the reference clock. The decoder 15 outputs the decoded data and a read clock synchronized therewith in accordance with the reference clock and the encoded data. The decoded data and the read clock become outputs of the digital information reproducing apparatus.

FIG. 7 is a diagram showing a format of the signal recorded on a recording medium in the above conventional apparatus.

On the recording medium, data is segmented and a segment unit is called a sector. One sector is constructed by a sector mark 1 indicative of the head, an address part 2 in which an address of the sector is recorded, and a data part 3 in which the user data is recorded.

FIG. 8 is a timing chart of each signal in FIG. 6 in the normal operating mode.

In the above conventional apparatus, in a case when the unrecorded sector was reproduced because of an incorrect command from a host computer to control the drive apparatus or an error of the drive apparatus or in a case when the sector of an incorrect recording state was reproduced, no reproduction signal is obtained or the reproduction signal level is low. Thus, no signal is included in the binarized encoded data and a frequency of a reference clock of the PLL circuit becomes low.

In such a case, a frequency of a read clock which is output from the decoder 15 also becomes low in response to the low reference clock frequency and a case exists wherein the number of read clocks in one sector does not reach a predetermined number, although the clocks of a number which is equal to a predetermined number of data in one sector (the number of data which can be recorded in the data part 3) should inherently be output.

FIG. 9 shows a timing chart in the case wherein such an inconvenience occurred.

Referring now to FIG. 9, since the frequency of the read clock is shifted to a low frequency, a predetermined number of read clocks are not output until the next sector mark detection signal is generated, so that its output operation is not finished.

If a predetermined number of read clocks are not generated in one sector as mentioned above, this means that the reproducing operation in one sector is not normally finished when such an operation is seen from the host computer side. Thus, a problem exists that the circuit of the host computer or the like which receives the decoded data causes an erroneous operation.

Even in a case wherein the sector in which no information is recorded was reproduced or in the case wherein the sector of an incorrect recording state was reproduced, there is also a problem that the next sector cannot be continuously reproduced.

SUMMARY OF THE INVENTION

It is an object of the present invention to provide a digital information reproducing apparatus in which the foregoing drawbacks are eliminated.

Another object of the invention is to provide a digital information reproducing apparatus which does not cause an erroneous operation even if an unrecorded sector or the sector of an incorrect recording state has been reproduced.

Still another object of the invention is to provide a digital information reproducing apparatus which can continuously reproduce the next sector even if the unrecorded sector or the sector of an incorrect recording state has been reproduced.

The above and other objects and features of the present invention will become apparent from the following detailed description and the appended claims with reference to the accompanying drawings.

BRIEF DESCRIPTION OF THE DRAWINGS

FIG. 3 is a block diagram showing the details of a frequency comparison judging circuit. 40 in the embodiment;

FIG. 4 is a timing chart of the circuit shown in FIG. 3;

DETAILED DESCRIPTION OF THE PREFERRED EMBODIMENTS

Figure 1:
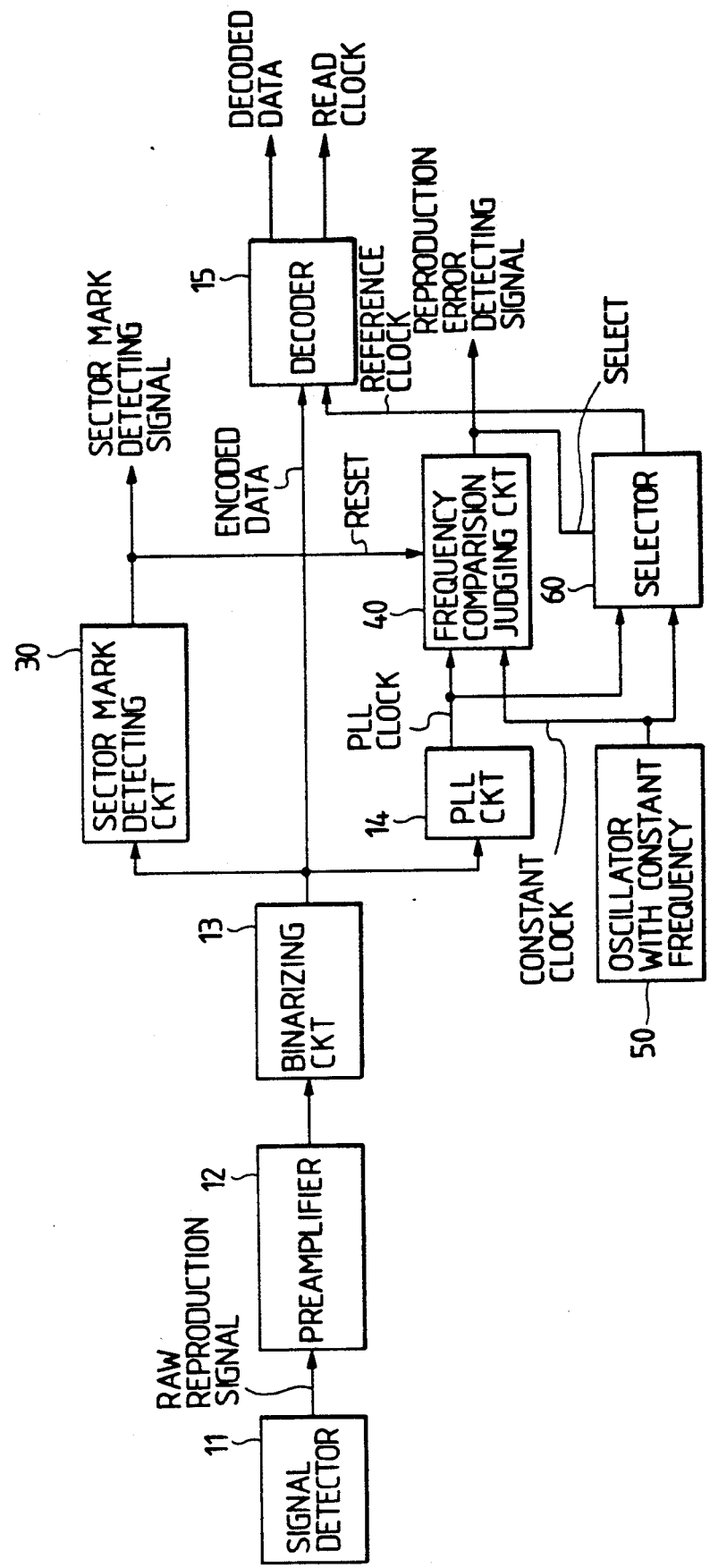
FIG. 1 is a block diagram showing an embodiment of the present invention.

FIG. 1 is a block diagram showing an embodiment of the present invention.

Figure 6:
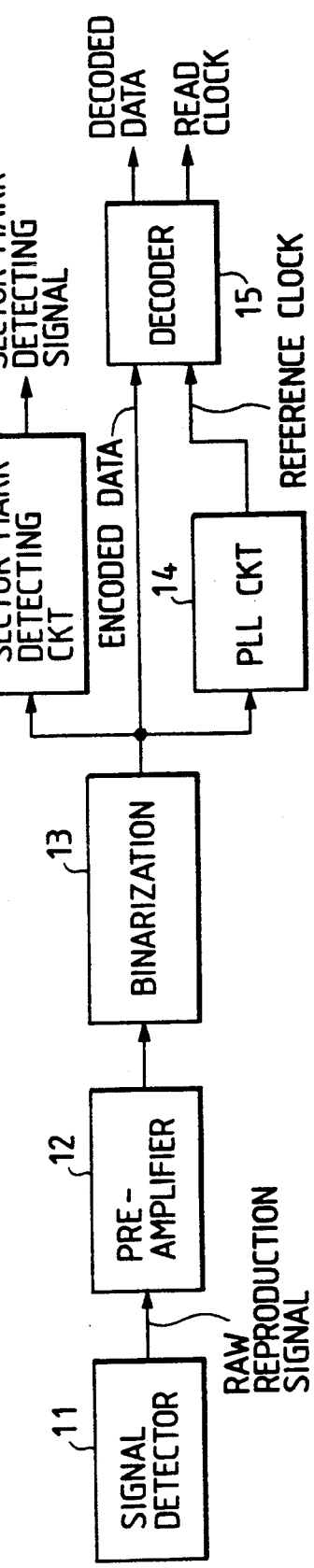
FIG. 6 is a block diagram showing a conventional example.
Figure 7:
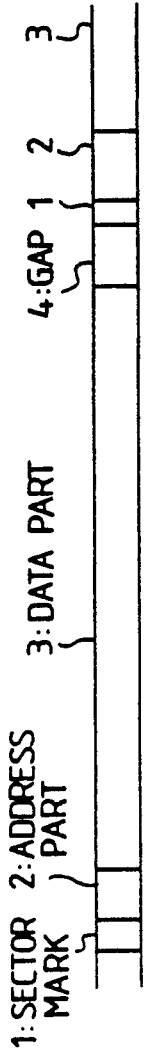
FIG. 7 is a diagram showing a format of one sector on a recording medium.
Figure 8:
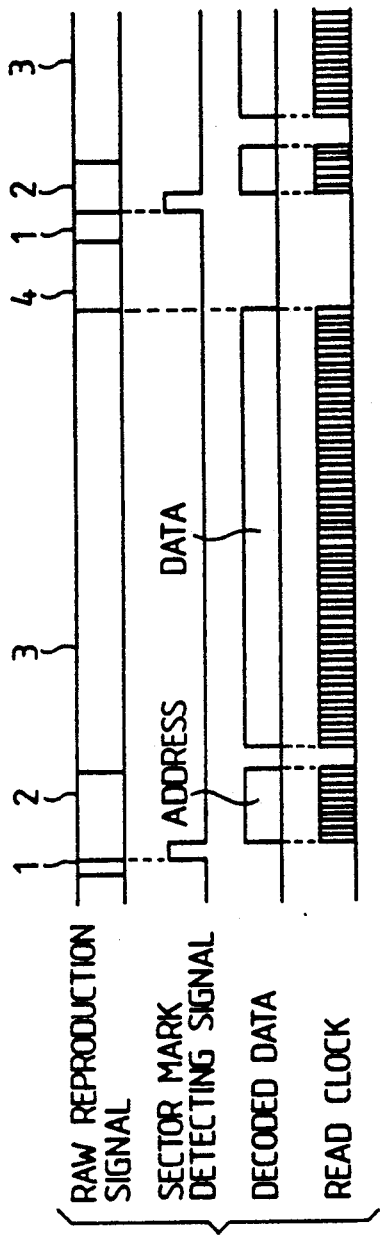
FIG. 8 is a reproduction timing chart in the normal state in the conventional apparatus.
Figure 9:
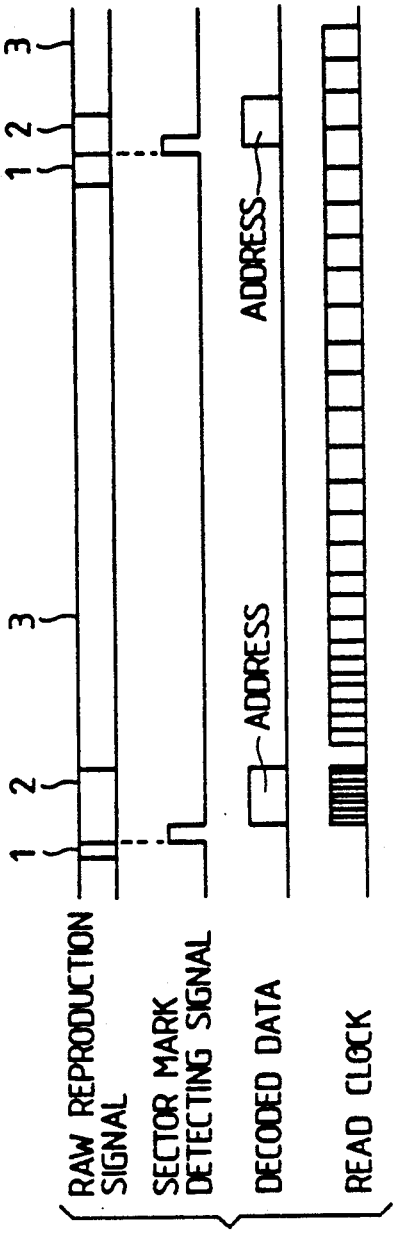
FIG. 9 is a timing chart in the abnormal state in the conventional apparatus.

In FIG. 1, the same parts and components as those shown in the conventional apparatus of FIG. 6 are designated by the same reference numerals.

The apparatus of the embodiment differs from the conventional apparatus of FIG. 6 such that the apparatus of the present embodiment has a frequency comparison judging circuit 40, an oscillator 50 with a constant frequency, and a selector 60.

A sector mark detecting circuit 30 detects a sector mark.

The frequency comparison judging circuit 40 compares a frequency of a PLL clock from the PLL circuit 14 and a frequency of a clock from the oscillator 50. The frequency comparison judging circuit 40 also outputs a reproduction error detecting signal when the frequency of the PLL clock deviates from a predetermined allowable value.

When the difference between the frequency of the PLL clock and the frequency of the predetermined clock exceeds the predetermined allowable value, the selector 60 functions so as to send the predetermined clock from the oscillator 50 as a reference clock to the decoder 15 in place of the PLL clock. On the other hand, if the frequency difference lies within the predetermined allowable value, the selector 60 functions so as to send the PLL clock as a reference clock to the decoder 15.

The selector 60 is one of control means for switching and outputting the predetermined clock formed by the oscillator with a constant frequency as a read clock when the frequency of the PLL clock from the PLL circuit 14 deviates from the predetermined allowable value.

The operation of the embodiment will now be described.

FIG. 3 is a block diagram showing a practical example of the frequency comparison judging circuit 40 in the embodiment.

The frequency comparison judging circuit 40 has an x counter 41, a y counter 42, a z counter 43, a judging circuit 44, and an error judging area generating circuit 45 including an A counter and a B counter.

FIG. 4 is an operation explanatory diagram of the circuit shown in FIG. 3.

In the above embodiment, the frequency comparison judging circuit 40 compares the frequency of the predetermined clock which is output from the oscillator 50 and the frequency of the PLL clock.

When the x counter counts a predetermined number of predetermined clocks, a reset signal is output to the z counter, so that the z counter is reset and starts counting. A window signal is generated for a period of time when the z counter is executing the counting operation. On the other hand, when the y counter counts a predetermined number of PLL clocks, it outputs a judging edge signal.

If the difference between the frequency of the predetermined clock and the frequency of the PLL clock is small, as shown in FIG. 4, the judging edge signal is output during the counting operation of the z counter, that is, during the generation of the window signal, so that the judging circuit 44 does not output a reproduction error detecting signal.

However, if the difference between those two frequencies deviates from the predetermined allowable value, the judging edge signal is not output until the window signal trails (the leading edge of the judging edge signal is deviated from the window). If the timing for trailing of the window signal lies within an error judging area, the frequency comparison judging circuit 40 outputs the reproduction error detecting signal at this time. The reproduction error detecting signal is sent to the host computer. When the error judging area generating circuit 45 receives the sector mark detecting signal, the A counter starts the counting operation. When the A counter counts a predetermined number of predetermined clocks, the B counter starts the counting operation of the predetermined clocks.

During the counting operation of the B counter, the error judging area signal is output and the judging circuit 44 can execute the judgment on the basis of the error judging area signal. However, during the counting operation of the A counter, a case exists wherein the frequency of the PLL clock does not become stable. Therefore, the judging circuit does not execute the judging operation. The A and B counters can also count clocks of an oscillator which is separately provided.

When the counting operation of the z counter is finished and the window signal trails, a reset signal C is output to the x counter 41 and the y counter 42 and both of the counters are reset. The above frequency judging operation is repeated many times in one sector.

The frequency allowable value also may be set in accordance with ratios of the count values of the x, y, and z counters. On the other hand, each time information of another sector is reproduced, that is, each time the sector mark detection signal is input, the judging circuit 44 is reset and the PLL clock is selected as a reference clock.

Figure 2:
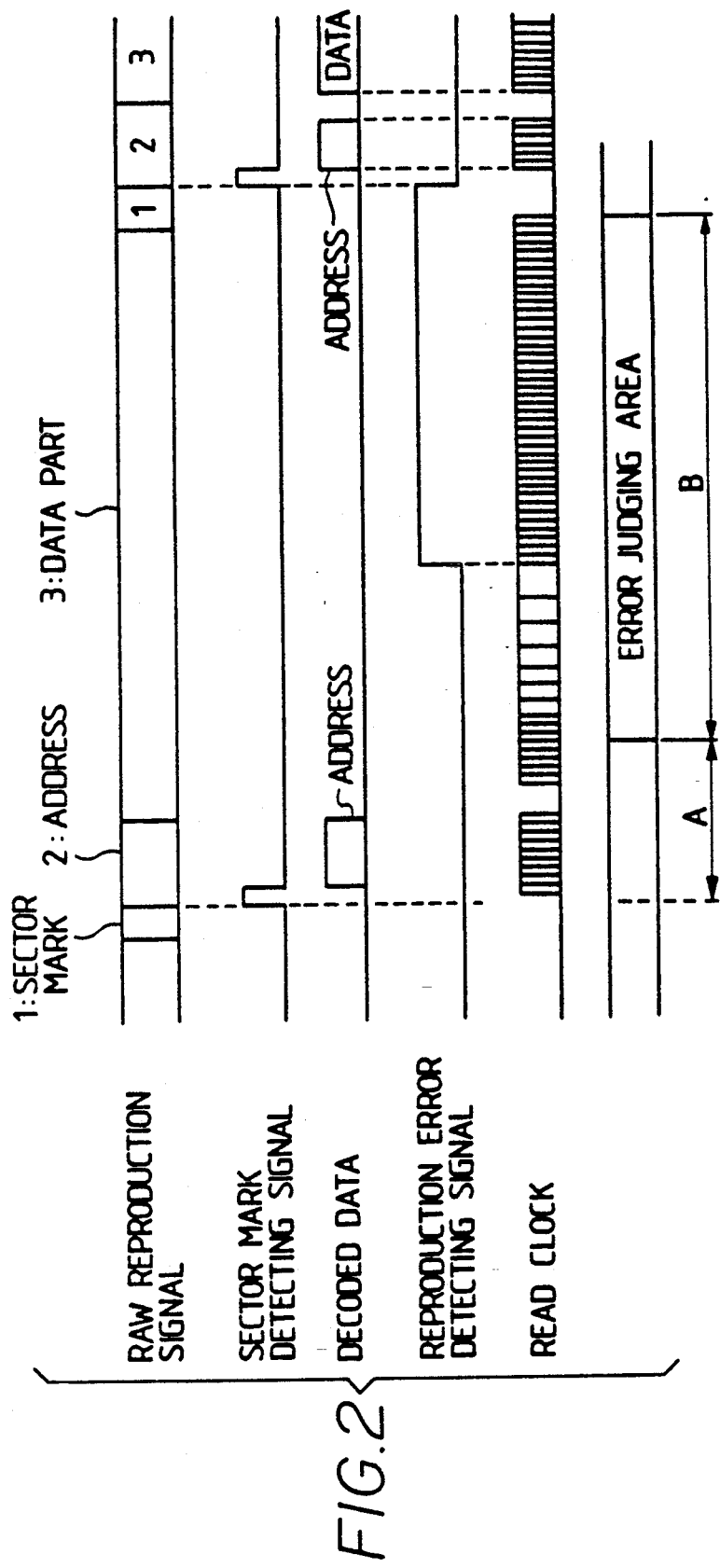
FIG. 2 is a timing chart in an abnormal state in the embodiment.

FIG. 2 is a time chart in a case wherein the unrecorded sector was reproduced in the embodiment.

Since no data is recorded in the sector, the frequency of the PLL clock gradually decreases and the frequency of the read clock also changes to a low frequency in association with the reduction of the PLL clock frequency. Thus, the frequency comparison judging circuit 40 detects the abnormality of the frequency of the PLL clock and changes the reproduction error signal level from "L" to "H". Due to this, in place of the PLL clock, the selector 60 switches and outputs the predetermined clock from the oscillator 50 and the predetermined clock is used as the read clock. Therefore, the generation of the read clocks of the number corresponding to a predetermined number of data is finished in the sector, that is, the transfer of the reproduction data is completed in one sector and the normal reproducing operation is finished.

Figure 5:
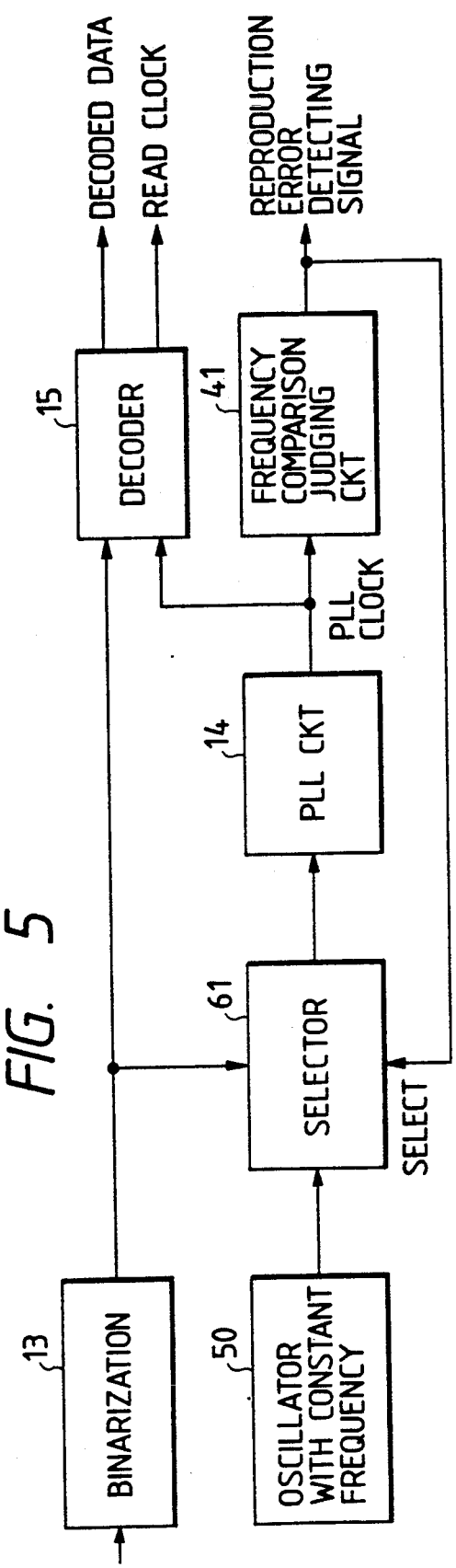
FIG. 5 is a block diagram showing another embodiment of the invention.

FIG. 5 is a block diagram showing another embodiment of the invention.

According to this other embodiment, a selector 61 and the oscillator 50 with a constant frequency are arranged in front of the PLL circuit 14. The frequency comparison judging circuit 40 has the same construction as that in FIG. 3.

When comparing this embodiment with that shown in FIG. 1, in the embodiment shown in FIG. 5, when an error occurs, the speed at which the frequency of the read clock is returned becomes slightly slower due to the period of time until the predetermined clocks from the oscillator with a constant frequency are locked by the PLL circuit 14. However, when an error occurs, since the PLL circuit 14 also operates based on the predetermined clocks, the operating frequency of the PLL circuit 14 can be limited. Therefore, it is possible to prevent the occurrence of an inconvenience with respect to the PLL circuit such that a pseudo lock is executed at quite a different frequency in spite of the fact that correct data was again input to the PLL circuit 14.

As described above, there are advantages such that even in a case wherein the unrecorded sector or the sector of an incorrect recording state was reproduced, the circuit of the host computer which receives the decoded data does not cause an erroneous operation and the next sector of such a sector can be continuously reproduced.

What is claimed is:

1. A digital information reproducing apparatus comprising:
   reading means for reading out digital information recorded on a recording medium;
   first clock generating means for producing a first clock synchronized with the digital information read out by said reading means;
   second clock generating means for generating a second clock of a predetermined frequency;
   processing means for processing the digital information read out by said reading means on the basis of one of the first clock produced by said first clock generating means and the second clock generated by said second clock generating means;
   judging means for judging whether a frequency of the first clock produced by said first clock generating means changes by a predetermined amount relative to the second clock, regardless of whether or not the first clock synchronizes with the digital information read out by said reading means; and
   switching means for switching from the first clock produced by said first clock generating means to the second clock generated by said second clock generating means when said judging means judges that the frequency of the first clock changes by the predetermined amount, so that said processing means processes the digital information on the basis of the second clock when the frequency of the first clock has changed by the predetermined amount.

2. An apparatus according to claim 1, wherein said first clock generating means comprises a PLL circuit for inputting the digital information read out by said reading means and for producing the first clock.

3. An apparatus according to claim 1, wherein said processing means comprises means for decoding the digital information read out by said reading means.

4. A digital information reproducing apparatus comprising:
   reading means for reading out digital information recorded on a recording medium;
   first clock generating means for producing a first clock synchronized with the digital information read out by said reading means;
   second clock generating means for generating a second clock of a predetermined frequency;
   processing means for processing the digital information read out by said reading means on the basis of one of the first clock produced by said first clock generating means and the second clock generated by said second clock generating means;
   judging means for judging whether the frequency of the first clock produced by said first clock generating means has deviated from a predetermined range on the basis of the second clock generated by said second clock generating means; and
   switching means for switching from the first clock produced by said first clock generating means to the second clock generated by said second clock generating means when said judging means judges that the frequency of the first clock has deviated from the predetermined range, so that said processing means processes the digital information on the basis of the second clock when the frequency of the first clock has deviated from the predetermined range.

5. An apparatus according to claim 1, wherein said judging means further comprises a first counter and a second counter for respectively counting the first clock and the second clock, and further comprising means for determining that the frequency of the first clock changes by the predetermined amount when a count of the first counter does not reach a predetermined number of first clocks when a count of the second counter reaches a predetermined number of second clocks.

6. An apparatus according to claim 1, wherein said reading means comprises means for reading out the digital information from a plurality of recording blocks on the recording medium, and said switching means comprises means for switching from the second clock to the first clock produced by said first clock generating means to supply the first clock to said processing means each time digital information recorded in a different recording block is read out by said reading means.

7. An apparatus according to claim 1, wherein said switching means comprises means for inhibiting the switching from the first clock to the second clock for a predetermined time after the start of reading of the digital information by said reading means.

8. A digital information reproducing apparatus comprising:
   reading means for reading out digital information recorded on a recording medium;
   first clock generating means for generating a first clock of a predetermined frequency;
   selecting means for selecting either one of outputs of said reading means and said first clock generating means;
   second clock generating means for producing a second clock synchronized with an output selected by said selecting means;
   processing means for processing the digital information read out by said reading means on the basis of one of the second clock produced by said second clock generating means and the first clock generated by said first clock generating means;
   judging means for judging whether a frequency of the second clock produced by said second clock generating means has deviated from a predetermined range; and
   control means for controlling said selecting means according to the judging by said judging means, such that said selecting means selects the first clock to cause said processing means to process the digital information on the basis of the first clock when said judging means judges that the frequency of the second clock produced by said second clock generating means has deviated from the predetermined range.

9. An apparatus according to claim 8, wherein said second clock generating means comprises a PLL circuit for inputting one of the digital information read out by said reading means and the first clock generated by said first clock generating means and for producing the second clock.

10. An apparatus according to claim 8, wherein said processing means comprises means for decoding the digital information read out by said reading means.

11. An apparatus according to claim 8, wherein said judging means comprises means for judging whether the frequency of the second clock produced by said second clock generating means has deviated from the predetermined range on the basis of the first clock generated by said first clock generating means.

* * * * *